(12) United States Patent
Yokoyama

(10) Patent No.: US 11,622,558 B2
(45) Date of Patent: Apr. 11, 2023

(54) AQUEOUS AGROCHEMICAL SUSPENSION COMPOSITION AND METHOD FOR SPRAYING SAME

(71) Applicant: KUMIAI CHEMICAL INDUSTRY CO., LTD., Tokyo (JP)

(72) Inventor: Waki Yokoyama, Tokyo (JP)

(73) Assignee: KUMIAI CHEMICAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 17/439,169

(22) PCT Filed: Mar. 4, 2020

(86) PCT No.: PCT/JP2020/009158
§ 371 (c)(1),
(2) Date: Sep. 14, 2021

(87) PCT Pub. No.: WO2020/189282
PCT Pub. Date: Sep. 24, 2020

(65) Prior Publication Data
US 2022/0159960 A1 May 26, 2022

(30) Foreign Application Priority Data

Mar. 18, 2019 (JP) .............................. JP2019-050487

(51) Int. Cl.
| | | |
|---|---|---|
| A01N 43/80 | (2006.01) | |
| A01N 25/10 | (2006.01) | |
| A01P 13/00 | (2006.01) | |
| A01N 25/30 | (2006.01) | |
| A01N 25/04 | (2006.01) | |

(52) U.S. Cl.
CPC ............. *A01N 43/80* (2013.01); *A01N 25/04* (2013.01); *A01N 25/30* (2013.01); *A01P 13/00* (2021.08)

(58) Field of Classification Search
CPC ...................................................... A01N 25/30
See application file for complete search history.

(56) References Cited

U.S. PATENT DOCUMENTS

| | | | | |
|---|---|---|---|---|
| 2006/0270559 | A1* | 11/2006 | Maekawa | ............... A01N 25/04 504/358 |
| 2008/0269060 | A1 | 10/2008 | Griffiths et al. | |
| 2013/0196854 | A1* | 8/2013 | Kamei | ................... A01N 25/30 504/358 |
| 2014/0066303 | A1* | 3/2014 | Liu | ........................ A01N 39/04 504/323 |
| 2016/0262394 | A1 | 9/2016 | Dieckmann et al. | |
| 2017/0006870 | A1 | 1/2017 | Arai et al. | |
| 2017/0027162 | A1 | 2/2017 | Hodge et al. | |
| 2018/0332843 | A1 | 11/2018 | Ohta et al. | |
| 2018/0343866 | A1 | 12/2018 | Yamazaki et al. | |

FOREIGN PATENT DOCUMENTS

| | | |
|---|---|---|
| CN | 1430469 | 7/2003 |
| CN | 1832681 | 9/2006 |
| CN | 1976589 | 6/2007 |
| CN | 108013051 | 5/2018 |
| CN | 108289450 | 7/2018 |
| CN | 108289452 | 7/2018 |
| CN | 108293988 | 7/2018 |
| JP | 2001-039801 | 2/2001 |
| JP | 2011-057614 | 3/2011 |
| JP | 2016-540072 | 12/2016 |
| TW | I221402 | 10/2004 |
| WO | 01/11964 | 2/2001 |
| WO | 01/93679 | 12/2001 |
| WO | 200/013692 | 2/2005 |
| WO | 2011/030806 | 3/2011 |
| WO | 2015/129729 | 9/2015 |

OTHER PUBLICATIONS

International Search Report dated Jun. 2, 2020, in International (PCT) Application No. PCT/JP2020/009158, with English translation.
Taiwanese Office Action dated Jan. 31, 2023 in corresponding Taiwanese Patent Application No. 109108311, with partial English translation.

* cited by examiner

*Primary Examiner* — Kyle A Purdy
(74) *Attorney, Agent, or Firm* — Wenderoth, Lind & Ponack, L.L.P.

(57) ABSTRACT

An object of the present invention is to provide: an aqueous suspension agrochemical composition having a good storage stability, with which an increase in the viscosity of a formulation can be inhibited even when the composition contains a high concentration of pyroxasulfone; and a process of spraying the same. The present invention provides: an aqueous suspension agrochemical composition containing: pyroxasulfone; an acrylic graft copolymer; an alcohol alkoxylate; and a lignin sulfonate, in which composition the alcohol alkoxylate contains a polyoxyethylene alkyl ether; and a process of spraying an aqueous suspension agrochemical composition, the process including spraying the above-described aqueous suspension agrochemical composition to a field where agricultural/horticultural plants grow.

8 Claims, No Drawings

AQUEOUS AGROCHEMICAL SUSPENSION COMPOSITION AND METHOD FOR SPRAYING SAME

TECHNICAL FIELD

The present invention relates to an aqueous suspension agrochemical composition containing pyroxasulfone, and a process of spraying the same. More particularly, the present invention relates to: an aqueous suspension agrochemical composition having a good storage stability, with which an increase in the viscosity of a formulation can be inhibited even when the composition contains a high concentration of pyroxasulfone; and a process of spraying the same.

BACKGROUND ART

Pyroxasulfone shows a high level of herbicidal effect on weeds of the family Poaceae [e.g., barnyard grass (*Echinochloa crus-galli* (L.) P. Beauv. var. *crus-galli*), southern crabgrass (*Digitaria ciliaris* (Retz.) Koeler), green foxtail (*Setaria viridis* (L.) P. Beauv.), annual bluegrass (*Poa annua* L.), Johnson grass (*Sorghum halepense* (L.) Pers.), orange foxtail (*Alopecurus aequalis* Sobol.), Italian ryegrass (*Lolium multiflorum* Lam.), rigid ryegrass (*L. rigidum* Gaud.), common wild oat (*Avena fatua* L.), slough grass (*Beckmannia syzigachne* (Steud.) Fernald), and oat (*A. sativa* L.)], broad-leaved weeds [e.g., curlytop knotweed (*Persicaria lapathifolia* (L.) Delarbre), slender amaranth (*Amaranthus viridis* L.), white goosefoot (*Chenopodium album* L.), starwort (*Stellaria media* L.), velveleaf (*Abutilon avicennae*), prickly mallow (*Sida spinosa* L.), bigpod Sesbania (*Sesbania herbacea* (Mill.) McVaugh), ragweed (*Ambrosia artemisiifolia* L.), morning glory (*Ipomoea nil* (L.) Roth), stickwilly (*Galium spurium* L. var. *echinospermon* (Wallr.) Hayek), birdeye speedwell (*Veronica persica* Poir.), ivy-leaved speedwell (*V. hederifolia* L.), common henbit (*Lamium amplexicaule* L.), and violet (*Viola mandshurica* W. Becker)] and perennial and annual weeds of the family Cyperaceae [e.g., Coco-grass (*Cyperus rotundus* L.), Yellow nutsedge (*C. esculentus* L.), shortleaf spikesedge (*Kyllinga brevifolia* Rottb. var. *leiolepis*), Asian flatsedge (*C. microiria* Steud.), and rice flat sedge (*C. iria* L.)], and is known to have a broad herbicidal spectrum. Examples of an agrochemical composition containing pyroxasulfone include the agrochemical composition disclosed in Patent Document 1.

Incidentally, dusts, granules, wettable powders, water-dispersible granules, solutions, aqueous suspensions, emulsifiable concentrates and the like are known as the forms of agrochemical formulations that have been put into practical use to date. Among these agrochemical formulations, an aqueous suspension, which is a liquid agrochemical formulation in which fine particles of an agrochemically active component relatively insoluble in water are suspended in water, is a widely and commonly used formulation form because not only it does not cause dusting at the time of use and thus presents little concern about exposure of a user to the agrochemical formulation, but also it is easily quantifiable and is highly safe as it does not use a low-flash-point organic solvent having adverse effects on the human body and the environment.

In a mode where the aqueous suspension is applied to an agricultural land or a non-agricultural land, the aqueous suspension may be applied directly as a spray solution; however, a process in which the aqueous suspension is diluted with a prescribed amount of water to ensure a sufficient liquid volume and the resulting diluted solution is applied as a spray solution is generally employed.

Meanwhile, in the production of a formulation, from the standpoints of the production and transportation cost and the handling, it is desired to increase the concentration of the resulting agrochemical formulation. As a highly concentrated agrochemical formulation, for example, a solid formulation obtained by wet-grinding a suspension that contains a polyalkylene glycol-type nonionic surfactant containing ethylene glycol and propylene glycol in a block form in the molecule and subsequently kneading and granulating the resulting suspension is known (Patent Document 2).

RELATED ART DOCUMENTS

Patent Documents

[Patent Document 1] WO 2015/129729
[Patent Document 2] JP 2001-039801 A

SUMMARY OF THE INVENTION

Problems to be Solved by the Invention

However, in an aqueous suspension, when the content of an agrochemically active component is increased, a dispersion medium and an auxiliary agent that are required for the production of a formulation are relatively limited in terms of their amount that can be incorporated, and the viscosity of the resulting formulation is thus increased, causing a problem in handling and deteriorating the dispersibility and redispersibility of the formulation. In addition, since the amount of the dispersion medium and the auxiliary agent is limited in this manner, the selectivity of an agrochemically active component is limited as well. In the case of pyroxasulfone, not only an increase in its concentration leads to a marked increase in the viscosity, but also the degree thereof tends to worsen with time. Therefore, it has been difficult to put an aqueous suspension containing a high concentration of pyroxasulfone into practical use.

In view of the above, an object of the present invention is to provide: an aqueous suspension agrochemical composition having a good storage stability, with which an increase in the viscosity of a formulation can be inhibited even when the composition contains a high concentration of pyroxasulfone; and a process of spraying the same.

Means for Solving the Problems

The present inventors intensively studied to discover that the above-described problems can be solved by incorporating an acrylic graft copolymer, a polyoxyethylene alkyl ether as an alcohol alkoxylate, and a lignin sulfonate, thereby completing the present invention.

That is, the present invention encompasses the followings.

(1) An aqueous suspension agrochemical composition containing: pyroxasulfone; an acrylic graft copolymer; an alcohol alkoxylate; and a lignin sulfonate, wherein the alcohol alkoxylate contains a polyoxyethylene alkyl ether.

(2) The aqueous suspension agrochemical composition according to (1), wherein the acrylic graft copolymer is a graft copolymer of an acrylic polymer and a hydrophilic polymer, and the hydrophilic polymer is a polyethylene glycol.

(3) The aqueous suspension agrochemical composition according to (1) or (2), wherein the polyoxyethylene alkyl ether is an ethoxylation product of an aliphatic alcohol, and the aliphatic alcohol has 12 to 15 carbon atoms and an average number of moles of added ethylene oxide of 5 to 9.

(4) The aqueous suspension agrochemical composition according to any one of (1) to (3), wherein the alcohol alkoxylate further contains an alkoxyalkyl ether of a polyoxyethylene-polyoxypropylene block copolymer.

(5) The aqueous suspension agrochemical composition according to any one of (1) to (4), wherein the lignin sulfonate is a sodium salt, a potassium salt, a calcium salt, a magnesium salt, an ammonium salt, or a primary to quaternary substituted ammonium salt.

(6) The aqueous suspension agrochemical composition according to any one of (1) to (5), wherein the content ratio of pyroxasulfone is 50% or higher in terms of mass with respect to a total amount.

(7) The aqueous suspension agrochemical composition according to any one of (1) to (6), wherein the content ratio of pyroxasulfone is 55% or higher in terms of mass with respect to a total amount.

(8) The aqueous suspension agrochemical composition according to any one of (1) to (7), wherein the content ratio of pyroxasulfone is 60% or higher in terms of mass with respect to a total amount.

(9) The aqueous suspension agrochemical composition according to any one of (1) to (8), wherein the viscosity at 20° C., which is measured using a B-type viscometer at a rotation speed of 30 rpm after the aqueous suspension agrochemical composition is left to stand at 54° C. for 2 weeks, is 100 to 1,000 mPa·s.

(10) A process of spraying an aqueous suspension agrochemical composition, the process including spraying the aqueous suspension agrochemical composition according to any one of (1) to (9) to a field where agricultural/horticultural plants grow.

Effects of the Invention

According to the present invention, an aqueous suspension agrochemical composition having a good storage stability, with which an increase in the viscosity of a formulation can be inhibited even when the composition contains a high concentration of pyroxasulfone and a process of spraying the same can be provided.

MODE FOR CARRYING OUT THE INVENTION

The aqueous suspension agrochemical composition of the present invention is an aqueous suspension agrochemical composition containing: pyroxasulfone; an acrylic graft copolymer; an alcohol alkoxylate; and a lignin sulfonate, the composition being characterized in that the alcohol alkoxylate contains a polyoxyethylene alkyl ether.

In the present invention, pyroxasulfone is incorporated as an agrochemically active component. The content ratio of pyroxasulfone is not particularly restricted; however, when a concentration of pyroxasulfone is high, an increase in viscosity is more prominently inhibited and storage stability is improved. Accordingly, pyroxasulfone can be incorporated at a high concentration of, for example, 40% or higher, 45% or higher, 50% or higher, 55% or higher, or 60% or higher, in terms of mass with respect to a total amount of the aqueous suspension agrochemical composition. An upper limit of the content ratio of pyroxasulfone is not particularly restricted; however, it is 75% by mass, preferably 70% by mass, more preferably 65% by mass.

In the aqueous suspension agrochemical composition of the present invention, an acrylic graft copolymer is incorporated as well. The acrylic graft copolymer is preferably a graft copolymer of an acrylic polymer and a hydrophilic polymer, more preferably a graft polymer that has an acrylic polymer as a main chain and a hydrophilic polymer as a side chain.

The acrylic polymer is preferably a polymer that contains, as a monomer unit, a $C_3$ to $C_5$ monoethylenically unsaturated carboxylic acid such as acrylic acid or methacrylic acid, a methyl ester, hydroxyl-$C_2$ to $C_3$-alkyl ester or the like of a $C_3$ to $C_5$ monoethylenically unsaturated carboxylic acid, such as methyl acrylate, methyl methacrylate, hydroxyethyl acrylate or hydroxyethyl methacrylate, more preferably a copolymer of a $C_3$ to $C_5$ monoethylenically unsaturated carboxylic acid monomer and a methyl ester or hydroxyl-$C_2$ to $C_3$-alkyl ester monomer of a $C_3$ to $C_5$ monoethylenically unsaturated carboxylic acid, particularly preferably a copolymer of methacrylic acid and methyl methacrylate. Examples of the hydrophilic polymer include polyethylene glycols.

The acrylic graft copolymer that can be used in the present invention may be a commercially available product and, for example, ATLOX™ 4913 (manufactured by Croda International Plc) can be suitably used.

In the present invention, an acrylic graft copolymer may be used singly, or two or more thereof may be used in combination. The content ratio of the acrylic graft copolymer(s) used in the present invention is not particularly restricted; however, it is usually 0.1 to 19.9% by mass, preferably 0.3 to 15% by mass, more preferably 0.5 to 10% by mass, based on a total amount of the aqueous suspension agrochemical composition. When the content ratio is lower than 0.1% by mass, suspensibility may be deteriorated, whereas when the content ratio is higher than 19.9% by mass, the ease of handling may be deteriorated due to an excessively high viscosity of the resulting aqueous suspension agrochemical composition.

Further, in the aqueous suspension agrochemical composition of the present invention, an alcohol alkoxylate is incorporated. The alcohol alkoxylate contains a polyoxyethylene alkyl ether. This polyoxyethylene alkyl ether is preferably an ethoxylation product of an aliphatic alcohol.

The number of carbon atoms of the aliphatic alcohol is preferably 8 to 24, more preferably 10 to 20, still more preferably 12 to 15. It is desired that, in the polyoxyethylene alkyl ether of the present invention, the average number of moles of added ethylene oxide be 3 to 10, preferably 4 to 10, more preferably 5 to 9.

The polyoxyethylene alkyl ether may be a commercially available product and, for example, SYNPERONIC A7 (manufactured by Croda International Plc) can be suitably used.

The alcohol alkoxylate used in the present invention may contain two or more kinds of the above-described polyoxyethylene alkyl ether within a range that does not impair the effects of the present invention. The content ratio of the polyoxyethylene alkyl ether used in the present invention is not particularly restricted; however, it is usually 0.06 to 8.9% by mass, preferably 0.08 to 8% by mass, more preferably 0.1 to 7.2% by mass, based on a total amount of the aqueous suspension agrochemical composition. When the content ratio is lower than 0.06% by mass, the ease of handling may be deteriorated due to an excessively high viscosity, whereas when the content ratio is higher than 8.9% by mass, it may be difficult to produce a formulation.

As desired, the alcohol alkoxylate used in the present invention may further contain an alkoxyalkyl ether of a polyoxyethylene-polyoxypropylene block copolymer. It is desired that the polyoxyethylene-polyoxypropylene block copolymer for the alkoxyalkyl ether of the polyoxyethylene-polyoxypropylene block copolymer have an HLB value of preferably about 10 to 19, more preferably about 14 to 18. Meanwhile, the alkoxyalkyl ether moiety is preferably a (C1 to 6 alkoxy) (C1 to 6 alkyl) ether, more preferably butoxybutyl ether.

The alkoxyalkyl ether of the polyoxyethylene-polyoxypropylene block copolymer may be a commercially available product and, for example, ATLAS™ G-5000 (manufactured by Croda International Plc) can be suitably used.

The alcohol alkoxylate used in the present invention may contain two or more kinds of the above-described alkoxyalkyl ether of polyoxyethylene-polyoxypropylene block copolymer within a range that does not impair the effects of the present invention. The content ratio of the alkoxyalkyl ether of polyoxyethylene-polyoxypropylene block copolymer used in the present invention is not particularly restricted; however, it is usually 0.06 to 8.9% by mass, preferably 0.08 to 8% by mass, more preferably 0.1 to 7.2% by mass, based on a total amount of the aqueous suspension agrochemical composition. When the content ratio is lower than 0.06% by mass, the ease of handling may be deteriorated due to an excessively high viscosity, whereas when the content ratio is higher than 8.9% by mass, it may be difficult to produce a formulation.

The alcohol alkoxylate used in the present invention preferably contains a polyoxyethylene alkyl ether and an alkoxylakyl ether of a polyoxyethylene-polyoxypropylene block copolymer since the occurrence of caking can thereby be further suppressed. Such an alcohol alkoxylate may be a commercially available product and, for example, ATLOX™ 4894 (manufactured by Croda International Plc) can be suitably used.

In the aqueous suspension agrochemical composition of the present invention, a lignin sulfonate is further incorporated. Examples of the lignin sulfonate include a sodium salt, a potassium salt, a calcium salt, a magnesium salt, an ammonium salt, and a primary to quaternary substituted ammonium salt, among which sodium lignin sulfonate is preferred. Such a lignin sulfonate may be a commercially available product such as "PEARLLEX NP" (manufactured by Nippon Paper Industries Co., Ltd.) can be used.

In the present invention, a lignin sulfonate may be used singly, or two or more thereof may be used in combination. The content ratio of the lignin sulfonate(s) used in the present invention is not particularly restricted; however, it is usually 2.1 to 9.9% by mass, preferably 2.5 to 8% by mass, more preferably 3.0 to 5% by mass, based on a total amount of the aqueous suspension agrochemical composition. When the content ratio is lower than 2.1% by mass, the suspensibility may be deteriorated, whereas when the content ratio is higher than 9.9% by mass, it may be difficult to produce a formulation.

Further, in the aqueous suspension agrochemical composition of the present invention, a thickening agent and/or an antifoaming agent may be incorporated as desired so as to adjust the viscosity. The aqueous suspension agrochemical composition of the present invention contains a high concentration of pyroxasulfone, which is a solid component, as an agrochemically active component and thus exhibits a certain level of viscosity without an addition of a thickening agent thereto; therefore, even when a thickening agent is incorporated, the amount thereof may be smaller than the amount used in a conventional aqueous suspension agrochemical composition. Meanwhile, an aqueous suspension agrochemical composition in which pyroxasulfone is incorporated at a high concentration is likely to generate a foam during the production, particularly in the wet-grinding step or the like, and the foam is unlikely to disappear; therefore, in the case of incorporating an antifoaming agent, a desired effect is expected to be attained by setting the amount thereof to be somewhat in excess of the amount used in a conventional aqueous suspension agrochemical composition.

Specific examples of the thickening agent include: natural polysaccharides, such as gum arabic, xanthan gum, guar gum, tamarind gum, and pectin; and mineral fine powders, such as white carbon, talc, bentonite, and clay. For the purpose of reducing liquid phase separation of the aqueous suspension agrochemical composition with time, it is preferred to incorporate a thickening agent of a type that imparts the composition with structural viscosity, and it is particularly preferred to incorporate a mineral fine powder, such as white carbon, talc, bentonite or clay, since this serves the above-described purpose. The above-described thickening agents may be used singly, or two or more thereof may be used in combination as desired. The content ratio of the thickening agent(s) is usually 0.05 to 3% by mass, preferably 0.1 to 2% by mass, more preferably 0.15 to 1% by mass, based on a total amount of the aqueous suspension agrochemical composition.

Specific examples of the antifoaming agent include: silicone-based antifoaming agents typified by dimethyl polysiloxane and polyphenyl siloxane; and fatty acids and metal salts thereof typified by myristic acid and sodium stearate, and any substance known for this application may be used singly, or two or more thereof may be used in combination as desired. The content ratio of the antifoaming agent is usually 0.05 to 3% by mass, preferably 0.1 to 2% by mass, more preferably 0.15 to 1% by mass, based on a total amount of the aqueous suspension agrochemical composition.

Still further, in the aqueous suspension agrochemical composition of the present invention, an auxiliary agent may be incorporated as desired. Examples of the auxiliary agent which is an optional component include an antifreezing agent, a pH modifier and a preservative, and a known dye such as Pigment Orange 16 or Blue No. 1 may be added as well if desired.

Specific examples of the antifreezing agent include: water-soluble substances having a relatively low molecular weight that are typified by urea and common salt; and water-soluble polyhydric alcohols typified by propylene glycol, ethylene glycol, diethylene glycol and glycerol, and any substance known for this application may be used singly, or two or more thereof may be used in combination as desired.

Examples of the pH modifier include: acidic substances typified by sulfuric acid and potassium dihydrogen phosphate; basic substances typified by sodium hydroxide and calcium carbonate; and mixtures of a weak acid and a conjugate base thereof as well as mixtures of a weak base and a conjugate acid thereof, which exhibit a buffering capability in aqueous solutions, and any substance known for this application may be used singly, or two or more thereof may be used in combination as desired.

Examples of the preservative include parabens, sorbic acid salts, 5-chloro-2-methyl-4-isothiazolin-3-one, 2-bromo-2-propan-1,3-diol, 1,2-benzisothiazolin-3-one, sodium benzoate, sodium p-hydroxybenzoate and potassium sorbate, and any substance known for this application may be used singly, or two or more thereof may be used in combination as desired.

The acrylic graft copolymer, the polyoxyethylene alkyl ether and the lignin sulfonate, which are indispensable components in the aqueous suspension agrochemical composition of the present invention, exhibit a surfactant effect and also function as a wetting agent, a dispersant and the like; therefore, the aqueous suspension agrochemical composition is not required to contain a surfactant. However, if desired, a surfactant may be incorporated in accordance with the intended purpose. Examples of the surfactant include the following compounds.

[Nonionic Surfactants]

Polyalkylene glycol higher fatty acid esters, polyoxyalkylene arylphenyl ethers, sorbitan monoalkylates, acetylene alcohols, acetylene diols, and alkylene oxide adducts thereof

[Cationic Surfactants]

Tetraalkyl ammonium salts, alkylamines, and alkyl pyridinium salts.

[Anionic Surfactants]

Alkyl aryl sulfonates, dialkyl sulfonates, dialkyl succinates, aryl sulfonates and condensation products thereof, alkyl sulfuric acid esters, alkyl phosphoric acid esters, alkylaryl sulfuric acid esters, alkylaryl phosphoric acid esters, polycarboxylates, polyoxyalkylene aryl ether sulfates, and polyoxyalkylene aryl ether phosphates.

[Amphoteric Surfactants]

Alkyl betaines, alkyl amine oxides, alkyl imidazolinium betaines, amino acids, and lecithin.

[Other Surfactants]

Silicone-based surfactants other than the above-described polyoxyalkylene siloxanes, and fluorine-based surfactants.

Generally, in an aqueous suspension agrochemical composition, an excessively low viscosity leads to prominent liquid phase separation during storage, while an extremely high viscosity makes it difficult to discharge the composition from a bottle at the time of use. The aqueous suspension agrochemical composition of the present invention has an appropriate viscosity; therefore, such liquid phase separation during storage is reduced, and the composition is discharged from a bottle in a favorable manner at the time of use. In the present invention, the viscosity at 20° C., which is measured using a B-type viscometer at a rotation speed of 30 rpm after the aqueous suspension agrochemical composition is left to stand at 54° C. for 2 weeks, is preferably about 100 to 1,000 mPa·s, more preferably about 200 to 900 mPa·s, still more preferably about 250 to 850 mPa·s.

As desired, the aqueous suspension agrochemical composition of the present invention can be made into the form of a mixed formulation that contains, in addition to pyroxasulfone, an additional agrochemically active component within a range that does not impair the effects of the present invention. The additional agrochemically active component may be used singly, or two or more thereof may be used in combination. Specific examples of the agrochemically active component that may be additionally incorporated include, but not limited to, the components enumerated below.

[Antibacterial Active Components]

Azaconazole, acibenzolar-S-methyl, azoxystrobin, anilazine, amisulbrom, aminopyrifen, ametoctradin, aldimorph, isotianil, isopyrazam, isofetamid, isoflucypram, isoprothiolane, ipconazole, ipflufenoquin, ipfentrifluconazole, iprodione, iprovalicarb, iprobenfos, imazalil, iminoctadine-trialbesilate, iminoctadine-triacetate, imibenconazole, inpyrfluxam, imprimatin A, imprimatin B, edifenphos, etaconazole, ethaboxam, ethirimol, ethoxyquin, etridiazole, enestroburin, enoxastrobin, epoxiconazole, organic oils, oxadixyl, oxazinylazole, oxathiapiprolin, oxycarboxin, oxine-copper, oxytetracycline, oxpoconazole-fumarate, oxolinic acid, copper dioctanoate, octhilinone, ofurace, orysastrobin, o-phenylphenol, kasugamycin, captafol, carpropamid, carbendazim, carboxin, carvone, quinoxyfen, quinofumelin, chinomethionat, captan, quinconazole, quintozene, guazatine, cufraneb, coumoxystrobin, kresoximmethyl, clozylacon, chlozolinate, chlorothalonil, chloroneb, cyazofamid, diethofencarb, diclocymet, dichlofluanid, dichlobenthiazox, diclomezine, dicloran, dichlorophen, dithianon, diniconazole, diniconazole-M, zineb, dinocap, dipymetitrone, diphenylamine, difenoconazole, cyflufenamid, diflumetorim, cyproconazole, cyprodinil, simeconazole, dimethirimol, dimethyl disulfide, dimethomorph, cymoxanil, dimoxystrobin, ziram, silthiofam, streptomycin, spiroxamine, sedaxane, zoxamide, dazomet, tiadinil, thiabendazole, thiram, thiophanate, thiophanate-methyl, thifluzamide, tecnazene, tecloftalam, tetraconazole, debacarb, tebuconazole, tebufloquin, terbinafine, dodine, dodemorph, triadimenol, triadimefon, triazoxide, trichlamide, triclopyricarb, tricyclazole, triticonazole, tridemorph, triflumizole, trifloxystrobin, triforine, tolylfluanid, tolclofos-methyl, tolnifanide, tolprocarb, nabam, natamycin, naftifine, nitrapyrin, nitrothal-isopropyl, nuarimol, copper nonyl phenol sulphonate, *Bacillus subtilis* (strain: QST 713), validamycin, valifenalate, picarbutrazox, bixafen, picoxystrobin, pydiflumetofen, bitertanol, binapacryl, biphenyl, piperalin, hymexazol, pyraoxystrobin, pyraclostrobin, pyraziflumid, pyrazophos, pyrapropoyne, pyrametostrobin, pyriofenone, pyrisoxazole, pyridachlometyl, pyrifenox, pyributicarb, pyribencarb, pyrimethanil, pyroquilon, vinclozolin, ferbam, famoxadone, phenazine oxide, fenamidone, fenaminstrobin, fenarimol, fenoxanil, ferimzone, fenpiclonil, fenpicoxamid, fenpyrazamine, fenbuconazole, fenfuram, fenpropidin, fenpropimorph, fenhexamid, folpet, phthalide, bupirimate, fuberidazole, blasticidin-S, furametpyr, furalaxyl, furancarboxylic acid, fluazinam, fluindapyr, fluoxastrobin, fluoxapiprolin, fluopicolide, fluopimomide, fluopyram, fluoroimide, fluxapyroxad, fluquinconazole, furconazole, furconazole-cis, fludioxonil, flusilazole, flusulfamide, flutianil, flutolanil, flutriafol, flufenoxystrobin, flumetover, flumorph, proquinazid, prochloraz, procymidone, prothiocarb, prothioconazole, bronopol, propamocarb-hydrochloride, propiconazole, propineb, probenazole, bromuconazole, flometoquin, florylpicoxamid, hexaconazole, benalaxyl, benalaxyl-M, benodanil, benomyl, pefurazoate, penconazole, pencycuron, benzovindiflupyr, benthiazole, benthiavalicarb-isopropyl, penthiopyrad, penflufen, boscalid, fosetyl (aluminum, calcium, sodium), polyoxin, polycarbamate, Bordeaux mixture, mancozeb, mandipropamid, mandestrobin, maneb, myclobutanil, mineral oils, mildiomycin, methasulfocarb, metam, metalaxyl, metalaxyl-M, metiram, metyltetraprole, metconazole, metominostrobin, metrafenone, mepanipyrim, mefentrifluconazole, meptyldinocap, mepronil, iodocarb, laminarin, phosphorous acid and its salts, copper oxychloride, silver, cuprous oxide, copper hydroxide, potassium bicarbonate, sodium bicarbonate, sulfur, oxyquinoline sulfate, copper sulfate, (3,4-dichloroisothiazol-5-yl)-methyl-4-(tert-butyl)benzoate (chemical name, CAS No. 1231214-23-5), BAF-045 (Code No.), BAG-010 (Code No.), UK-2A (Code No.), DBEDC (dodecylbenzenesulfonic acid bisethylenediamine copper complex salt [II]), MIF-1002 (Code No.), NF-180 (Code No.), TPTA (triphenyl tin acetate), TPTC (triphenyl tin chloride), TPTH (triphenyl tin hydroxide), and nonpathogenic *Erwinia carotovora*.

[Insecticidal Active Components]

Acrinathrin, azadirachtin, azamethiphos, azinphos-ethyl, azinphos-methyl, acequinocyl, acetamiprid, acetoprole, acephate, azocyclotin, abamectin, afidopyropen, afoxolaner, amidoflumet, amitraz, alanycarb, aldicarb, aldoxycarb, allethrin [including d-cis-trans-isomer and d-trans-isomer], isazophos, isamidofos, isocarbophos, isoxathion, isocycloseram, isofenphos-methyl, isoprocarb, ivermectin, imicyafos, imidacloprid, imiprothrin, indoxacarb, esfenvalerate, ethiofencarb, ethion, ethiprole, ethylene dibromide, etoxazole, etofenprox, ethoprophos, etrimfos, emamectin benzoate, endosulfan, empenthrin, oxazosulfyl, oxamyl, oxydemeton-methyl, oxydeprofos, omethoate, cadusafos, kappa-tefluthrin, kappa-bifenthrin, kadethrin, karanjin, cartap, carbaryl, carbosulfan, carbofuran, gamma-BHC, xylylcarb, quinalphos, kinoprene, chinomethionat, coumaphos, cryolite, clothianidin, clofentezine, chromafenozide, chlorantraniliprole, chlorethoxyfos, chlordane, chloropicrin, chlorpyrifos, chlorpyrifos-methyl, chlorfenapyr, chlorfenvinphos, chlorfluazuron, chlormephos, chloroprallethrin, cyanophos, diafenthiuron, diamidafos, cyantraniliprole, dienochlor, cyenopyrafen, dioxabenzofos, diofenolan, cyclaniliprole, dicrotophos, dichlofenthion, cycloprothrin, dichlorvos, dicloromezotiaz, 1,3-dichloropropene, dicofol, dicyclanil, disulfoton, dinotefuran, dinobuton, cyhalodiamide, cyhalothrin [including gamma-isomer and lambda-isomer], cyphenothrin [including (1R)-trans-isomer], cyfluthrin [including beta-isomer], diflubenzuron, cyflumetofen, diflovidazin, cyhexatin, cypermethrin [including alpha-isomer, beta-isomer, theta-isomer, and zeta-isomer], dimpropyridaz, dimethylvinphos, dimefluthrin, dimethoate, silafluofen, cyromazine, spinetoram, spinosad, spirodiclofen, spirotetramat, spiropidion, spiromesifen, sulcofuron-sodium, sulfluramid, sulfoxaflor, sulfotep, diazinon, thiacloprid, thiamethoxam, tioxazafen, thiodicarb, thiocyclam, thiosultap, thionazin, thiofanox, thiometon, tyclopyrazoflor, tetrachlorantraniliprole, tetrachlorvinphos, tetradifon, tetraniliprole, tetramethylfluthrin, tetramethrin, tebupirimfos, tebufenozide, tebufenpyrad, tefluthrin, teflubenzuron, demeton-S-methyl, temephos, deltamethrin, terbufos, tralomethrin, transfluthrin, triazamate, triazophos, trichlorfon, triflumuron, triflumezopyrim, trimethacarb, tolfenpyrad, naled, nitenpyram, novaluron, noviflumuron, *Verticillium lecanii*, hydroprene, *Pasteuria penetrans* spore, vamidothion, parathion, parathion-methyl, halfenprox, halofenozide, bioallethrin, bioallethrin S-cyclopentenyl, bioresmethrin, bistrifluron, hydramethylnon, bifenazate, bifenthrin, pyflubumide, piperonyl butoxide, pymetrozine, pyraclofos, pyrafluprole, pyridaphenthion, pyridaben, pyridalyl, pyrifluquinazon, pyriprole, pyriproxyfen, pirimicarb, pyrimidifen, pyriminostrobin, pirimiphos-methyl, pyrethrine, famphur, fipronil, fenazaquin, fenamiphos, fenitrothion, fenoxycarb, fenothiocarb, phenothrin [including (1R)-trans-isomer], fenobucarb, fenthion, phenthoate, fenvalerate, fenpyroximate, fenbutatin oxide, fenpropathrin, fonofos, sulfuryl fluoride, butocarboxim, butoxycarboxim, buprofezin, furathiocarb, prallethrin, fluacrypyrim, fluazaindolizine, fluazuron, fluensulfone, sodium fluoroacetate, fluxametamide, flucycloxuron, flucythrinate, flusulfamide, fluvalinate [including tau-isomer], flupyradifurone, flupyrazofos, flupyrimin, flufiprole, flufenerim, flufenoxystrobin, flufenoxuron, fluhexafon, flubendiamide, flumethrin, fluralaner, prothiofos, protrifenbute, flonicamid, propaphos, propargite, profenofos, broflanilide, brofluthrinate, profluthrin, propetamphos, propoxur, flometoquin, bromopropylate, hexythiazox, hexaflumuron, *Paecilomyces tenuipes, Paecilomyces fumosoroceus*, heptafluthrin, heptenophos, permethrin, benclothiaz, benzpyrimoxan, bensultap, benzoximate, bendiocarb, benfuracarb, *Beauveria tenella, Beauveria bassiana, Beauveria brongniartii*, phoxim, phosalone, fosthiazate, fosthietan, phosphamidon, phosmet, polynactin complex (polynactins), formetanate, phorate, malathion, milbemectin, mecarbam, mesulfenfos, methoprene, methomyl, metaflumizone, methamidophos, metham, methiocarb, methidathion, methyl isothiocyanate, methyl bromide, methoxychlor, methoxyfenozide, methothrin, metofluthrin, epsilon-metofluthrin, metolcarb, mevinphos, meperfluthrin, *Monacrosporium phymatophagum*, monocrotophos, momfluorothrin, epsilon-momfluorothrin, litlure-A, litlure-B, aluminum phosphide, zinc phosphide, phosphine, lufenuron, rescalure, resmethrin, lepimectin, rotenone, fenbutatin oxide, calcium cyanide, nicotine sulfate, (Z)-11-tetradecenyl=acetate, (Z)-11-hexadecenal, (Z)-11-hexadecenyl=acetate, (Z)-9,12-tetradecadienyl=acetate, (Z)-9-tetradecen-1-ol, (Z,E)-9,11-tetradecadienyl=acetate, (Z,E)-9,12-tetradecadienyl=acetate, *Bacillus popilliae, Bacillus subtillis, Bacillus sphaericus, Bacillus thuringiensis* subsp. *aizawai, Bacillus thuringiensis* subsp. *israelensis, Bacillus thuringiensis* subsp. Kurstaki, *Bacillus thuringiensis* subsp. *tenebrionis*, Bt proteins (Cry1Ab, Cry1Ac, Cry1Fa, Cry2Ab, mCry3A, Cry3Ab, Cry3Bb, and Cry34/35Ab1), CL900167 (Code No.), DCIP (bis(2-chloro-1-methylethyl)ether), DDT (1,1,1-trichloro-2,2-bis(4-chlorophenyl)ethane), DEP (dimethyl-2,2,2-trichloro-1-hydroxyethylphosphonate), DNOC (4,6-dinitro-o-cresol), DSP (O,O-diethyl-O-[4-(dimethylsulfamoyl)phenyl]-phosphorothioate), EPN (O-ethyl-O-4-(nitrophenyl)phenylphosphorothioate), nuclear polyhedrosis virus occlusion body, NA-85 (Code No.), NA-89 (Code No.), NC-515 (Code No.), RU15525 (Code No.), XMC, Z-13-eicosen-10-one, ZXI8901 (Code No.), 2-chloro-4-fluoro-5-[(5-trifluoromethylthio)pentyloxy]phenyl-2,2,2-trifluoroethyl sulfoxide (chemical name, CAS No.: 1472050-04-6), 2,4-dichloro-5-{2-[4-(trifluoromethyl)phenyl]ethoxy}phenyl 2,2,2-trifluoroethyl sulfoxide (chemical name, CAS No.: 1472052-11-1), 2,4-dimethyl-5-[6-(trifluoromethylthio)hexyloxy]phenyl-2,2,2-trifluoroethyl sulfoxide (chemical name, CAS No.: 1472050-34-2), 2-{2-fluoro-4-methyl-5-[(2,2,2-trifluoroethyl)sulfinyl]phenoxy}-5-(trifluoromethyl)pyridine (chemical name, CAS No.: 1448758-62-0), 3-chloro-2-{2-fluoro-4-methyl-5-[(2,2,2-trifluoroethyl)sulfinyl]phenoxy}-5-(trifluoromethyl) pyridine (chemical name, CAS No.: 1448761-28-1), 4-fluoro-2-methyl-5-(5,5-dimethylhexyloxy)phenyl 2,2,2-trifluoroethyl sulfoxide (chemical name, CAS No.: 1472047-71-4), and NI-30 (Code No.).

[Herbicidal Active Components]

Ioxynil, aclonifen, acrolein, azafenidin, acifluorfen (including salts with sodium or the like), azimsulfuron, asulam, acetochlor, atrazine, anilofos, amicarbazone, amidosulfuron, amitrole, aminocyclopyrachlor, aminopyralid, amiprofos-methyl, ametryn, alachlor, alloxydim, isouron, isoxachlortole, isoxaflutole, isoxaben, isoproturon, ipfencarbazone, imazaquin, imazapic (including salts with amine or the like), imazapyr (including salts with isopropylamine or the like), imazamethabenz-methyl, imazamox, imazethapyr, imazosulfuron, indaziflam, indanofan, eglinazine-ethyl, esprocarb, ethametsulfuron-methyl, ethalfluralin, ethidimuron, ethoxysulfuron, ethoxyfen-ethyl, ethofumesate, etobenzanid, endothal disodium, oxadiazon, oxadiargyl, oxaziclomefone, oxasulfuron, oxyfluorfen, oryzalin, orthosulfamuron, orbencarb, oleic acid, cafenstrole, carfentrazone-ethyl, karbutilate, carbetamide, quizalofop-ethyl, quizalofop-P-ethyl, quizalofop-P-tefuryl, quinoclamine, quinclorac, quinmerac, cumyluron, clacyfos, glyphosate (including salts with sodium, potassium, ammonium, amine, propylamine, isopropylamine, dimethylamine, trimesium or the like), glufosinate (including salts with amine, sodium or the like, glufosinate-P-sodium, clethodim, clodinafop-propargyl, clopyralid, clomazone, chlomethoxyfen, clomeprop, cloransulam-methyl, chloramben, chloridazon, chlorimuron-ethyl, chlorsulfuron, chlorthal-dimethyl, chlorthiamid, chlorphthalim, chlorflurenol-methyl, chlorpropham, chlorbromuron, chloroxuron, chlorotoluron, ketospiradox (including salts with sodium, calcium, ammonia or the like), saflufenacil, sarmentine, cyanazine, cyanamide, diuron, diethatyl-ethyl, dicamba (including salts with amine, diethylamine, isopropylamine, diglycol amine, sodium, lithium or the like), cycloate, cycloxydim, diclosulam, cyclosulfamuron, cyclopyranil, cyclopyrimorate, dichlobenil, diclofop-P-methyl, diclofop-methyl, dichlorprop, dichlorprop-P, diquat, dithiopyr, siduron, dinitramine, cinidon-ethyl, cinosulfuron, dinoseb, dinoterb, cyhalofop-butyl, diphenamid, difenzoquat, diflufenican, diflufenzopyr, simazine, dimethachlor, dimethametryn, dimethenamid, dimethenamid-P, simetryn, dimepiperate, dimefuron, cinmethylin, swep, sulcotrione, sulfentrazone, sulfosate, sulfosulfuron, sulfometuron-methyl, sethoxydim, terbacil, daimuron, thaxtomin A, dalapon, thiazopyr, tiafenacil, thiencarbazone (including its sodium salt, methyl ester, and the like), tiocarbazil, thiobencarb, thidiazimin, thifensulfuron-methyl, desmedipham, desmetryne, tetflupyrolimet, thenylchlor, tebutam, tebuthiuron, tepraloxydim, tefuryltrione, tembotrione, terbuthylazine, terbutryn, terbumeton, topramezone, tralkoxydim, triaziflam, triasulfuron, triafamone, tri-allate, trietazine, triclopyr, triclopyr-butotyl, trifludimoxazin, tritosulfuron, triflusulfuron-methyl, trifluralin, trifloxysulfuron-sodium, tribenuron-methyl, tolpyralate, naptalam (including salts with sodium or the like), naproanilide, napropamide, napropamide-M, nicosulfuron, neburon, norflurazon, vernolate, paraquat, halauxifen-benzyl, halauxifen-methyl, haloxyfop, haloxyfop-P, haloxyfop-etotyl, halosafen, halosulfuron-methyl, bixlozone, picloram, picolinafen, bicyclopyrone, bispyribac-sodium, pinoxaden, bifenox, piperophos, pyraclonil, pyrasulfotole, pyrazoxyfen, pyrazosulfuron-ethyl, pyrazolynate, bilanafos, pyraflufenethyl, pyridafol, pyrithiobac-sodium, pyridate, pyriftalid, pyributicarb, pyribenzoxim, pyrimisulfan, pyriminobac-methyl, pyroxsulam, phenisopham, fenuron, fenoxasulfone, fenoxaprop (including its methyl, ethyl, and isopropyl esters), fenoxaprop-P (including its methyl, ethyl, and isopropyl esters), fenquinotrione, fenthiaprop-ethyl, fentrazamide, phenmedipham, butachlor, butafenacil, butamifos, butylate, butenachlor, butralin, butroxydim, flazasulfuron, flamprop (including its methyl, ethyl, and isopropyl esters), flamprop-M (including its methyl, ethyl, and isopropyl esters), primisulfuron-methyl, fluazifop-butyl, fluazifop-P-butyl, fluazolate, fluometuron, fluoroglycofen-ethyl, flucarbazone-sodium, fluchloralin, flucetosulfuron, fluthiacet-methyl, flupyrsulfuron-methyl-sodium, flufenacet, flufenpyr-ethyl, flupropanate, flupoxame, flumioxazin, flumiclorac-pentyl, flumetsulam, fluridone, flurtamone, fluroxypyr, flurochloridone, pretilachlor, procarbazone-sodium, prodiamine, prosulfuron, prosulfocarb, propaquizafop, propachlor, propazine, propanil, propyzamide, propisochlor, propyrisulfuron, propham, profluazol, propoxycarbazone-sodium, profoxydim, bromacil, brompyrazon, prometryn, prometon, bromoxynil (including esters formed with butyric acid, octanoic acid, heptanoic acid or the like), bromofenoxim, bromobutide, florasulam, florpyrauxifen, hexazinone, pethoxamid, benazolin, penoxsulam, heptamaloxyloglucan, beflubutamid, beflubutamid-M, pebulate, pelargonic acid, bencarbazone, pendimethalin, benzfendizone, bensulide, bensulfuron-methyl, benzobicyclon, benzofenap, bentazone, pentanochlor, pentoxazone, benfluralin, benfuresate, fosamine, fomesafen, foramsulfuron, mecoprop (including salts with sodium, potassium, isopropylamine, triethanolamine, dimethylamine or the like), mecoprop-P-potassium, mesosulfuron-methyl, mesotrione, metazachlor, metazosulfuron, methabenzthiazuron, metamitron, metamifop, DSMA (disodium methane arsonate), methiozolin, methyldymuron, metoxuron, metosulam, metsulfuron-methyl, metobromuron, metobenzuron, metolachlor, metribuzin, mefenacet, monosulfuron (including its methyl, ethyl, and isopropyl esters), monolinuron, molinate, iodosulfuron, iodosulfulon-methyl-sodium, iofensulfuron, iofensulfuron-sodium, lactofen, lancotrione, linuron, rimsulfuron, lenacil), TCA (2,2,2-trichloroacetic acid; including salts with sodium, calcium, ammonia or the like), 2,3,6-TBA (2,3,6-trichlorobenzoic acid), 2,4,5-T (2,4,5-trichlorophenoxyacetic acid), 2,4-D (2,4-dichlorophenoxyacetic acid; including salts with amine, diethylamine, triethanolamine, isopropylamine, sodium, lithium or the like), ACN (2-amino-3-chloro-1,4-naphthoquinone), MCPA (2-methyl-4-chlorophenoxyacetic acid), MCPB (2-methyl-4-chlorophenoxybutyric acid; including its sodium salt, ethyl ester, and the like), 2,4-DB (4-(2,4-dichlorophenoxy) butyric acid), DNOC (4,6-dinitro-o-cresol; including salts with amine, sodium or the like), AE-F-150944 (Code No.), HW-02 (Code No.), IR-6396 (Code No.), MCPA-thioethyl, SYP-298 (Code No.), SYP-300 (Code No.), EPTC (S-ethyldipropylthiocarbamate), S-metolachlor, S-9750 (Code No.), and MSMA.

[Plant Growth Regulating Active Components]

1-methylcyclopropene, 1-naphthylacetamide, 2,6-diisopropylnaphthalene, 4-CPA (4-chlorophenoxyacetic acid), benzylaminopurine, ancymidol, aviglycine, carvone, chlormequat, cloprop, cloxyfonac, cloxyfonac-potassium, cyclanilide, cytokinins, daminozide, dikegulac, dimethipin, ethephon, epocholeone, ethychlozate, flumetralin, flurenol, flurprimidol, pronitridine, forchlorfenuron, gibberellins, inabenfide, indole acetic acid, indole butyric acid, maleic hydrazide, mefluidide, mepiquat chloride, n-decyl alcohol (n-decanol), paclobutrazol, prohexadione-calcium, prohydrojasmon, sintofen, thidiazuron, triacontanol, trinexapac-ethyl, uniconazole, uniconazole-P, 4-oxo-4-(2-phenylethyl) aminobutyric acid (chemical name, CAS No.: 1083-55-2), and calcium peroxide.

As the above-described pyroxasulfone and additional agrochemically active components used as desired, pure products or industrial raw materials may be directly used, or they may be used in the form of reservoir-type microcapsules in which the respective agrochemically active components coated are with a wall material, or in the form of monolithic-type microcapsules in which the respective agrochemically active components are dispersed in a core-material matrix. Application of a pre-formulation treatment technique of the agrochemically active components is not particularly restricted, and any known process and material may be used as desired.

When a mixed formulation is prepared by incorporating an additional agrochemically active component in addition to pyroxasulfone into the aqueous suspension agrochemical composition of the present invention, the content ratio of the agrochemically active component including pyroxasulfone is not particularly restricted; however, the additional agrochemically active component can be incorporated at a high concentration of, for example, 40% or higher, 45% or higher, 50% or higher, 55% or higher, or 60% or higher, in terms of mass with respect to a total amount of the aqueous suspension agrochemical composition. An upper limit of the content ratio is also not particularly restricted; however, it is 75% by mass, preferably 70% by mass, more preferably 65% by mass. It is noted here, however, that the upper limit of the content ratio of the agrochemically active component excluding pyroxasulfone is desirably maintained to be 40% by mass, preferably 35% by mass, more preferably 30% by mass.

In the aqueous suspension agrochemical composition of the present invention, if desired, a phytotoxicity-reducing compound may be incorporated as well. Specific examples of a phytotoxicity-reducing compound that can be incorporated are enumerated below; however, the present invention is not restricted to the below-enumerated phytotoxicity-reducing compounds.

[Phytotoxicity-Reducing Compounds]

AD-67 (4-dichloroacetyl-1-oxa-4-azaspiro[4.5]decane), DKA-24 (N1,N2-diallyl-N2-dichloroacetylglycinamide), MG-191 (2-dichloromethyl-2-methyl-1,3-dioxane), N-(2-methoxybenzoyl)-4-[(methylaminocarbonyl)amino]benzenesulfonamide (chemical name, CAS No.: 129531-12-0), PPG-1292 (2,2-dichloro-N-(1,3-dioxan-2-ylmethyl)-N-(2-propenyl)acetamide), R-29148 (3-dichloroacetyl-2,2,5-trimethyl-1,3-oxazolidine), TI-35 (1-dichloroacetylazepane), isoxadifen, isoxadifen-ethyl, oxabetrinil, cloquintcet-mexyl, cyometrinil, dichlormid, dicyclonone, cyprosulfamide, 1,8-naphthalic anhydride, fenchlorazole-ethyl, fenclorim, furilazole, fluxofenim, flurazole, benoxacor, mefenpyr, mefenpyr-ethyl, mefenpyr-diethyl, and lower alkyl-substituted benzoic acid.

The above-described phytotoxicity-reducing compounds may be used singly, or in combination of two or more thereof. When the phytotoxicity-reducing compound(s) is/are incorporated into the aqueous suspension agrochemical composition of the present invention, the content ratio of the phytotoxicity-reducing compound(s) is not particularly restricted; however, it is usually in a range of 1 to 40% by mass, preferably 2 to 30% by mass, more preferably 3 to 20% by mass, based on a total amount of the aqueous suspension agrochemical composition.

The aqueous suspension agrochemical composition of the present invention may be packaged, and this can not only contribute to labor saving in applying the composition but also improve the safety.

A process of producing the aqueous suspension agrochemical composition of the present invention is not particularly restricted, and one typical example thereof is a process of obtaining an aqueous suspension agrochemical composition by mixing pyroxasulfone, an acrylic graft copolymer, an alcohol alkoxylate, a lignin sulfonate, water and, as desired, other optional components and subsequently wet-grinding the resultant with stirring at a high speed along with a grinding medium such as glass beads, ceramic beads, or stainless-steel beads. Alternatively, for the purposes of, for example, improving the efficiency of the grinding step, the whole amount of pyroxasulfone and a portion of other raw materials are mixed and wet-ground to produce a slurry of pyroxasulfone, after which the remaining raw materials are added to the slurry and the resultant is mixed, whereby the aqueous suspension agrochemical composition can be obtained. As another process, the aqueous suspension agrochemical composition can also be obtained by dry-grinding pyroxasulfone by means of impact grinding, air-flow grinding or the like, and subsequently adding and dispersing the thus wet-ground pyroxasulfone in a mixed solution containing an acrylic graft copolymer, an alcohol alkoxylate, a lignin sulfonate, water and, as desired, other optional components.

Regardless of which of the above-described production processes is employed, it is preferred to finely grind pyroxasulfone so as to attain favorable dispersion of pyroxasulfone in the resulting aqueous suspension agrochemical composition and in a diluted solution prepared for use. The pyroxasulfone particle size to be attained in the grinding step is preferably about 0.2 to 10 µm, more preferably 0.3 to 6 µm, still more preferably about 0.5 to 3 µm, in terms of volume-average particle size. When the pyroxasulfone particles in the aqueous suspension agrochemical composition is larger than 10 µm, liquid phase separation during storage may be prominent, and rapid precipitation of the pyroxasulfone particles in the diluted solution may make it difficult to obtain a uniform spray solution. The same applies to an aqueous suspension agrochemical composition in which pyroxasulfone particles are observed with a tendency to aggregate, and such an aqueous suspension agrochemical composition does not withstand storage. The volume-average particle size of the pyroxasulfone particles can be determined by, for example, a laser diffraction process using a measuring apparatus employing this process as its measurement principle.

The aqueous suspension agrochemical composition of the present invention can be sprayed to, for example, a field where agricultural/horticultural plants grow.

In the spray process according to the present invention, a process of spraying the aqueous suspension agrochemical composition of the present invention is not particularly restricted, and the aqueous suspension agrochemical composition may be sprayed in accordance with a conventional process commonly used in soil treatment, foliage treatment or the like. The aqueous suspension agrochemical composition of the present invention may be used in any period before and after the germination of weeds to be controlled.

Examples of useful plants include wheat (*Triticum aestivum* L.), barley (*Hordeum vulgare* L.), rye (*Secale cereale* L.), corn (*Zea mays* L.), Sorghum (*Sorghum bicolor* (L.) Moench), soybean (*Glycine max* (L.) Men.), rapeseed (*Brassica napus* L.), safflower (*Carthamus tinctorium* L.), sunflower (*Helianthus annuus* L.), flax (*Linum usitatissimum* L.), peanut (*Arachis hypogaea* L.), sesame (*Sesamum indicum* L.), potato (*Solanum tuberosum* L.), sweet potato (*Ipomoea batatas* L.), onion (*Allium cepa* L.), garlic (*Allium sativum* L.), sugar beet (*Beta vulgaris*), Gossypium (*Gossypium arboreum* L.), mint (*Mentha spicata* L.), and grasses (*Zoysia* spp.). The weed control process according to the present invention is particularly effective on farmland for growing soybean and *Gossypium*.

When the aqueous suspension agrochemical composition of the present invention is to be sprayed, as required, the aqueous suspension agrochemical composition is diluted with water for spraying at a prescribed dilution factor to prepare a spray solution. The term "water for spraying" used herein refers to water used for diluting the aqueous suspension agrochemical composition. This water may be pure water or distilled water and may contain a trace amount of agriculturally and industrially acceptable impurities, and it is also possible to use drinking water such as mineral water or tap water, or agricultural or industrial water obtained by duly treating groundwater, river water or the like. Further, the water for spraying may be an aqueous liquid in which a prescribed amount of a spreader and/or other agrochemical formulation is diluted with the above-described water. The term "dilution factor" used herein refers to an amount (parts by mass) of the spray solution prepared by diluting 1 part by mass of the aqueous suspension agrochemical composition. The dilution factor is usually, but not particularly limited to, about 4 to 40 times for aerial spraying, or about 40 to 40,000 times for ground spraying. It is however needless to say that, in the use of the aqueous suspension agrochemical composition of the present invention, which is registered as an agricultural chemical, on agricultural/horticultural plants and the like, it is necessary to comply with the dilution factor prescribed as a use process in the agricultural chemical registration.

EXAMPLES

The present invention will now be described in detail by way of Examples thereof; however, the present invention is not restricted thereto by any means. It is noted here that, in the below-described Examples, "part(s)" and "%" mean "part(s) by mass" and "% by mass", respectively. The particle size is the average particle size (volume median diameter) measured using a laser diffraction-scattering particle size distribution analyzer (trade name "LASER MICRON SIZER LMS-2000e", manufactured by Seishin Enterprise Co., Ltd.). The viscosity is a value measured for each sample at 20° C. and 30 rpm using a B-type viscometer (trade name "TVB-10-M", manufactured by Toki Sangyo Co., Ltd.).

Examples 1 to 18 and Comparative Examples 1 to 5

The materials shown in Tables 1 to 5 were mixed at the respective ratios (parts by mass) shown in Tables 1 to 5, and the resulting mixtures were each subsequently wet-ground to obtain pyroxasulfone-containing aqueous suspension agrochemical compositions. For the thus obtained aqueous suspension agrochemical compositions, the particle size, the viscosity and the suspensibility were measured, and the separation rate, the caking and the redispersibility were evaluated. In addition, for the aqueous suspension agrochemical compositions that were left to stand at 54° C. for 2 weeks, the particle size, the viscosity and the suspensibility were measured. The results thereof are shown in Tables below. It is noted here that pyroxasulfone used in Examples had a purity of 99.2%.

(Suspensibility)

For 1,400 mg of each of the thus obtained aqueous suspension agrochemical compositions, the suspensibility was measured in accordance with CIPAC MT184. In addition, the suspensibility was also measured in the same manner after a lapse of 2 weeks at 54° C.

(Separation Rate)

The thus obtained aqueous suspension agrochemical compositions were each placed in a cylindrical container and statically stored, after which the amount of the resulting supernatant and that of the whole liquid were measured in terms of height using a ruler, and the ratio of the height of the supernatant with respect to the height of the whole liquid was determined as the separation rate.

(Caking)

For each of the thus obtained aqueous suspension agrochemical compositions, the degree of caking on the bottom of a sample container was examined using a spatula. The evaluations of caking that are shown in Tables 1 to 5 were made based on the following criteria.

−: No viscous matter was observed on the bottom of the container.

±: A small amount of viscous matter was observed on the bottom of the container.

+: A viscous matter was observed on the bottom of the container.

++: An aggregate of viscous matter was observed on the bottom of the container.

(Redispersibility)

The thus obtained aqueous suspension agrochemical compositions were each shaken to examine the degree of separation and the degree of dispersion of caking.

○: The aqueous suspension agrochemical composition was readily dispersed by shaking.

x: A sample remained on the bottom even with vigorous shaking.

TABLE 1

|  |  |  | Example | | | | |
|---|---|---|---|---|---|---|---|
|  |  |  | 1 | 2 | 3 | 4 | 5 |
| Composition | Pyroxasulfone | | 60.48 | 60.48 | 60.48 | 60.48 | 60.48 |
|  | Acrylic graft copolymer*1 | | 0.50 | 1.00 | 1.50 | 2.00 | 2.50 |
|  | Alcohol alkoxylate 1*2 | | 1.00 | 1.00 | 1.00 | 1.00 | 1.00 |
|  | Lignin sulfonate*3 | | 3.00 | 3.00 | 3.00 | 3.00 | 3.00 |
|  | Antifreezing agent*4 | | 5.00 | 5.00 | 5.00 | 5.00 | 5.00 |
|  | Thickening agent*5 | | 0.20 | 0.20 | 0.20 | 0.20 | 0.20 |
|  | Antifoaming agent*6 | | 0.20 | 0.20 | 0.20 | 0.20 | 0.20 |
|  | Preservative*7 | | 0.03 | 0.03 | 0.03 | 0.03 | 0.03 |
|  | Water | | remainder | remainder | remainder | remainder | remainder |
|  | Total | | 100.00 | 100.00 | 100.00 | 100.00 | 100.00 |
| Physical properties | Particle size (μm) | Initial | 2.5 | 2.5 | 2.6 | 2.5 | 2.6 |
|  |  | 54° C. × 2 weeks | 2.7 | 2.6 | 2.6 | 2.6 | 2.6 |
|  | Viscosity (mPa · s) | Initial | 1,375 | 1,244 | 1,231 | 798 | 1,136 |
|  |  | 54° C. × 2 weeks | 323 | 337 | 303 | 265 | 331 |
|  | Suspensibility (%) | Initial | 63.5 | 69.4 | 80.4 | 84.3 | 93.4 |
|  |  | 54° C. × 2 weeks | 62.2 | 74.7 | 83.4 | 91.7 | 89.1 |

TABLE 1-continued

|  | Example | | | | |
|---|---|---|---|---|---|
|  | 1 | 2 | 3 | 4 | 5 |
| Separation rate (%) | 0 | 6 | 4 | 4 | 6 |
| Caking | — | — | — | — | — |
| Redispersibility | ○ | ○ | ○ | ○ | ○ |

[1] polyethylene glycol-polymethyl methacrylate graft copolymer (trade name: "ATLOX™ 4913-LQ-(MV)", manufactured by Croda International Plc)
[2] mixture of polyoxyethylene (n = 5 to 9) $C_{12}$ to $C_{15}$ alkyl ether and polyoxyethylene/polyoxypropylene-4-butoxybutyl ether (trade name "ATLOX™ 4894-LQ-(MV)", manufactured by Croda International Plc)
[3] sodium lignin sulfonate (trade name "PEARLLEX NP", manufactured by Nippon Paper Industries Co., Ltd.)
[4] propylene glycol
[5] bentonite (trade name "KUNIPIA F", manufactured by Kunimine Industries, Co., Ltd.)
[6] silicone-based antifoaming agent (trade name "ASAHI SILICONE AF-128", manufactured by Asahi Chemical Co., Ltd.)
[7] 5-chloro-2-methyl-4-isothiazolin-3-one (trade name "BIOHOPE L", manufactured by K·I Chemical Industry Co., Ltd.)

TABLE 2

|  |  |  | Example | | | |
|---|---|---|---|---|---|---|
|  |  |  | 6 | 7 | 8 | 9 |
| Composition | Pyroxasulfone | | 60.48 | 60.48 | 60.48 | 60.48 |
|  | Acrylic graft copolymer[1] | | 3.00 | 4.00 | 5.00 | 10.00 |
|  | Alcohol alkoxylate 1[2] | | 1.00 | 1.00 | 1.00 | 1.00 |
|  | Lignin sulfonate[3] | | 3.00 | 3.00 | 3.00 | 3.00 |
|  | Antifreezing agent[4] | | 5.00 | 5.00 | 5.00 | 5.00 |
|  | Thickening agent[5] | | 0.20 | 0.20 | 0.20 | 0.20 |
|  | Antifoaming agent[6] | | 0.20 | 0.20 | 0.20 | 0.20 |
|  | Preservative[7] | | 0.03 | 0.03 | 0.03 | 0.03 |
|  | Water | | remainder | remainder | remainder | remainder |
|  | Total | | 100.00 | 100.00 | 100.00 | 100.00 |
| Physical properties | Particle size (μm) | Initial | 2.5 | 2.4 | 2.4 | 1.9 |
|  |  | 54° C. × 2 weeks | 2.6 | 2.6 | 2.6 | 2.1 |
|  | Viscosity (mPa · s) | Initial | 1,013 | 820 | 734 | 1,504 |
|  |  | 54° C. × 2 weeks | 326 | 321 | 348 | 664 |
|  | Suspensibility (%) | Initial | 91.0 | 94.2 | 93.9 | 98.8 |
|  |  | 54° C. × 2 weeks | 90.5 | 94.2 | 95.4 | 98.0 |
|  | Separation rate (%) | | 6 | 7 | 7 | 4 |
|  | Caking | | — | — | — | — |
|  | Redispersibility | | ○ | ○ | ○ | ○ |

TABLE 3

|  |  |  | Example | | | | |
|---|---|---|---|---|---|---|---|
|  |  |  | 10 | 11 | 12 | 13 | 14 |
| Composition | Pyroxasulfone | | 60.48 | 60.48 | 60.48 | 60.48 | 60.48 |
|  | Acrylic graft copolymer[1] | | 2.00 | 2.00 | 2.00 | 2.00 | 2.00 |
|  | Alcohol alkoxylate 1[2] | | 1.00 | 1.50 | 2.00 | 5.00 | 8.00 |
|  | Lignin sulfonate[3] | | 3.00 | 3.00 | 3.00 | 3.00 | 3.00 |
|  | Antifreezing agent[4] | | 5.00 | 5.00 | 5.00 | 5.00 | 5.00 |
|  | Thickening agent[5] | | 0.20 | 0.20 | 0.20 | 0.20 | 0.20 |
|  | Antifoaming agent[6] | | 0.20 | 0.20 | 0.20 | 0.20 | 0.20 |
|  | Preservative[7] | | 0.03 | 0.03 | 0.03 | 0.03 | 0.03 |
|  | Water | | remainder | remainder | remainder | remainder | remainder |
|  | Total | | 100.00 | 100.00 | 100.00 | 100.00 | 100.00 |
| Physical properties | Particle size (μm) | Initial | 2.5 | 2.0 | 2.0 | 2.5 | 2.3 |
|  |  | 54° C. × 2 weeks | 2.6 | 2.0 | 2.1 | 2.7 | 2.6 |
|  | Viscosity (mPa · s) | Initial | 798 | 1,713 | 1,296 | 1,164 | 2,669 |
|  |  | 54° C. × 2 weeks | 265 | 512 | 509 | 832 | <1,000 |

TABLE 3-continued

|  |  | Example | | | | |
|---|---|---|---|---|---|---|
|  |  | 10 | 11 | 12 | 13 | 14 |
| Suspen-sibility (%) | Initial | 84.3 | 95.4 | 95.6 | 86.8 | 97.2 |
|  | 54° C. × 2 weeks | 91.7 | 92.3 | 95.4 | 94.9 | 96.2 |
| Separation rate (%) |  | 4 | 0 | 4 | 4 | 4 |
| Caking |  | — | — | — | — | — |
| Redispersibility |  | ○ | ○ | ○ | ○ | ○ |

TABLE 4

|  |  |  | Example | | | |
|---|---|---|---|---|---|---|
|  |  |  | 15 | 16 | 17 | 18 |
| Com-position | Pyroxasulfone | | 60.48 | 60.48 | 60.48 | 60.48 |
|  | Acrylic graft copolymer[*1] | | 2.00 | 2.00 | 2.00 | 2.00 |
|  | Alcohol alkoxylate 1[*2] | | 0 | 1.00 | 1.00 | 1.00 |
|  | Alcohol alkoxylate 2[*8] | | 1.00 | 0 | 0 | 0 |
|  | Lignin sulfonate[*3] | | 3.00 | 3.00 | 4.00 | 5.00 |
|  | Antifreezing agent[*4] | | 5.00 | 5.00 | 5.00 | 5.00 |
|  | Thickening agent[*5] | | 0.20 | 0.20 | 0.20 | 0.20 |
|  | Antifoaming agent[*6] | | 0.20 | 0.20 | 0.20 | 0.20 |
|  | Preservative[*7] | | 0.03 | 0.03 | 0.03 | 0.03 |
|  | Water | | remainder | remainder | remainder | remainder |
|  | Total | | 100.00 | 100.00 | 100.00 | 100.00 |
| Physical properties | Particle size (μm) | Initial | 1.8 | 2.5 | 2.5 | 2.4 |
|  |  | 54° C. × 2 weeks | 2.0 | 2.6 | 2.6 | 2.6 |
|  | Viscosity (mPa · s) | Initial | 856 | 798 | 3,136 | 2,811 |
|  |  | 54° C. × 2 weeks | 687 | 265 | 514 | 504 |
|  | Suspen-sibility (%) | Initial | 98.3 | 84.3 | 96.5 | 97.3 |
|  |  | 54° C. × 2 weeks | 97.4 | 91.7 | 95.3 | 96.1 |
|  | Separation rate (%) | | 0 | 4 | 0 | 0 |
|  | Caking | | ± | — | — | — |
|  | Redispersibility | | Particle | Initial | Particle | Initial |

[*8]polyoxyethylene (n = 5 to 9) $C_{12}$ to $C_{15}$ alkyl ether (trade name "SYNPERONIC ® A7", manufactured by Croda International Plc)

TABLE 5

|  |  |  | Comparative Example | | | | |
|---|---|---|---|---|---|---|---|
|  |  |  | 1 | 2 | 3 | 4 | 5 |
| Com-position | Pyroxasulfone | | 60.48 | 60.48 | 60.48 | 60.48 | 0 |
|  | Diuron | | 0 | 0 | 0 | 0 | 60.48 |
|  | Acrylic graft copolymer[*1] | | 0 | 2.00 | 2.00 | 2.00 | 2.00 |
|  | Alcohol alkoxylate 1[*2] | | 1.00 | 0 | 1.00 | 0 | 1.00 |
|  | Polyoxyethylene/ polyoxypropylene alkyl ether[*9] | | 0 | 0 | 0 | 1.00 | 0 |
|  | Lignin sulfonate[*3] | | 3.00 | 3.00 | 0 | 3.00 | 3.00 |
|  | Antifreezing agent[*4] | | 5.00 | 5.00 | 5.00 | 5.00 | 5.00 |
|  | Thickening agent[*5] | | 0.20 | 0.20 | 0.20 | 0.20 | 0.20 |
|  | Antifoaming agent[*6] | | 0.20 | 0.20 | 0.20 | 0.20 | 0.20 |
|  | Preservative[*7] | | 0.03 | 0.03 | 0.03 | 0.03 | 0.03 |
|  | Water | | remainder | remainder | remainder | remainder | remainder |
|  | Total | | 100.00 | 100.00 | 100.00 | 100.00 | 100.00 |
| Physical prop-erties | Particle size (μm) | Initial | 2.6 | 2.6 | 2.3 | 1.9 | 2.8 |
|  |  | 54° C. × 2 weeks | 2.7 | 3.3 | 2.5 | 2.1 | 3.2 |
|  | Viscosity (mPa · s) | Initial | 1,471 | 1,342 | 439 | 1,118 | 431 |
|  |  | 54° C. × 2 weeks | 286 | 1,603 | 253 | 1,522 | 222 |

TABLE 5-continued

| | | Comparative Example | | | | |
|---|---|---|---|---|---|---|
| | | 1 | 2 | 3 | 4 | 5 |
| Suspensibility (%) | Initial | 52.8 | 98.0 | 19.1 | 98.2 | not measured |
| | 54° C. × 2 weeks | 46.7 | 93.0 | 16.5 | 95.6 | not measured |
| Separation rate (%) | | 0 | 0 | 10 | 8 | 18 |
| Caking | | — | ++ | — | + | ++ |
| Redispersibility | | ○ | × | ○ | × | × |

*[9]trade name "PEPOL B-184" (manufactured by TOHO Chemical Industry Co., Ltd.)

The invention claimed is:

1. An aqueous suspension agrochemical composition comprising:
   pyroxasulfone;
   an acrylic graft copolymer of an acrylic polymer and a polyethylene glycol;
   an alcohol alkoxylate; and
   a lignin sulfonate,
   wherein the alcohol alkoxylate comprises a polyoxyethylene alkyl ether, and
   wherein the content ratio of pyroxasulfone is 50% or higher in terms of mass with respect to a total amount.

2. The aqueous suspension agrochemical composition according to claim 1,
   wherein the polyoxyethylene alkyl ether is an ethoxylation product of an aliphatic alcohol, and
   wherein the aliphatic alcohol has 12 to 15 carbon atoms and an average number of moles of added ethylene oxide of 5 to 9.

3. The aqueous suspension agrochemical composition according to claim 1, wherein the alcohol alkoxylate further comprises an alkoxyalkyl ether of a polyoxyethylene-polyoxypropylene block copolymer.

4. The aqueous suspension agrochemical composition according to claim 1, wherein the lignin sulfonate is a sodium salt, a potassium salt, a calcium salt, a magnesium salt, an ammonium salt, or a primary to quaternary substituted ammonium salt.

5. The aqueous suspension agrochemical composition according to claim 1, wherein the content ratio of pyroxasulfone is 55% or higher in terms of mass with respect to a total amount.

6. The aqueous suspension agrochemical composition according to claim 1, wherein the content ratio of pyroxasulfone is 60% or higher in terms of mass with respect to a total amount.

7. The aqueous suspension agrochemical composition according to claim 1, wherein the viscosity at 20° C., which is measured using a B-type viscometer at a rotation speed of 30 rpm after the aqueous suspension agrochemical composition is left to stand at 54° C. for 2 weeks, is 100 to 1,000 mPa·s.

8. A process of spraying an aqueous suspension agrochemical composition, the process comprising spraying the aqueous suspension agrochemical composition according to claim 1 to a field where agricultural/horticultural plants grow.

* * * * *